US 7,483,640 B2

(12) United States Patent
Miyazaki

(10) Patent No.: US 7,483,640 B2
(45) Date of Patent: Jan. 27, 2009

(54) OPTICAL MULTILEVEL-CODED SIGNAL TRANSMISSION SYSTEM AND METHOD THEREOF, OPTICAL TRANSMITTER, AND MULTILEVEL-CODED SIGNAL LIGHT GENERATING METHOD

(75) Inventor: Tetsuya Miyazaki, Tokyo (JP)

(73) Assignee: National Institute of Information and Communication Technology, Incorporated Administrative Agency, Tokyo (JP)

( * ) Notice: Subject to any disclaimer, the term of this patent is extended or adjusted under 35 U.S.C. 154(b) by 812 days.

(21) Appl. No.: 10/957,151

(22) Filed: Sep. 30, 2004

(65) Prior Publication Data

US 2005/0111854 A1    May 26, 2005

(30) Foreign Application Priority Data

Nov. 20, 2003   (JP) .............................. 2003-390351

(51) Int. Cl.
*H04B 10/04* (2006.01)
(52) U.S. Cl. ...................................... 398/185; 398/188
(58) Field of Classification Search ................. 398/185, 398/186, 188, 183
See application file for complete search history.

(56) References Cited

U.S. PATENT DOCUMENTS 5,625,479 A * 4/1997 Suzuki et al. .................. 398/98

FOREIGN PATENT DOCUMENTS

JP          08008821 A  *  1/1996

OTHER PUBLICATIONS

Machine translation into English of JP-08008821-A, originally published Jan. 1996.*
Hayase, et al., "8-State per Symbol, 30-Gbits/s Optical Modulation / Demodulation Scheme," The 2003 Institute of Electronics, Information and Communication Engineers, Communication Society Conference, B-10-82, p. 401, and English Translation.
Nakazawa, et al., "Generation of a pseudorandom dark soliton data train and its coherent detection by one-bit-shifting with a Mach-Zehnder interferometer," Electronics Letters Jun. 22, 1995, vol. 31, No. 13, pp. 1084-1085.

(Continued)

*Primary Examiner*—Christina Y Leung
(74) *Attorney, Agent, or Firm*—Christie, Parker & Hale, LLP

(57) ABSTRACT

An optical multilevel-coded signal transmission system transmits information from an optical transmitter to an optical receiver through an optical transmission line using optical intensity and optical phase separately. The optical transmitter includes an inverted RZ signal light generator to generate an inverted RZ signal light intensity-modulated with a first data, and an optical phase modulator to phase-modulate the inverted RZ signal light according to a second data. The optical receiver includes a splitter to split a light input from the optical transmission line into first and second portions, an inverter to invert the first portion from the splitter, a first detector to detect the first data in the first portion inverted by the inverter, a converter to convert a phase-modulated signal included in the second portion from the splitter into an optical intensity-modulated signal, and a second detector to detect the second data in the optical intensity-modulated signal from the converter.

16 Claims, 4 Drawing Sheets

OTHER PUBLICATIONS

Wree, et al., "Experimental Investigation of Receiver Sensitivity of RZ-DQPSK Modulation Format using Balanced Detection," OFC 2003, vol. 2, Thursday Morning, ThE5, pp. 456-457.

Ohm, M., et al., "*Quaternary Optical ASK-DPSK and Receivers With Direct Detection*", IEEE Photonics Technology Letters, vol. 15, No. 1, Jan. 2003, pp. 159-161.

* cited by examiner

OPTICAL MULTILEVEL-CODED SIGNAL TRANSMISSION SYSTEM AND METHOD THEREOF, OPTICAL TRANSMITTER, AND MULTILEVEL-CODED SIGNAL LIGHT GENERATING METHOD

CROSS REFERENCE TO RELATED APPLICATIONS

This application claims priority to Japanese Patent Application No. 2003-390351, filed Nov. 20, 2003, the entire contents of which are incorporated herein by reference.

FIELD OF THE INVENTION

This invention relates to an optical multilevel-coded signal transmission system and method thereof, an optical transmitter, and a multilevel-coded signal light generating method.

BACKGROUND OF THE INVENTION

As a method to increase transmission capacity in an optical transmission system, multilevel-coded signal transmission is well known in the art (see Shigeki Hayase, et al., "8-State per Symbol, 30-Gbit/s Optical Modulation/Demodulation Scheme," The 2003 Institute of Electronics, Information and Communication Engineers, Communication Society Conference). A standard multilevel modulating method in a conventional multilevel-coded signal transmission system uses optical-phase modulation such as PSK (Phase Shift keying) and DPSK (Differential Phase Shift keying), and optical-intensity modulation together. For instance, the above reference discloses a 3-bit per symbol modulating method combining QPSK (Quadrature Phase Shift Keying) and binary ASK (Amplitude Shift keying) together.

However, QPSK requires complicated precoding before modulation. In the case that DQPSK (Differential Quadrature Phase Shift Keying) is used, it requires complex precoder and decoder.

On the other hand, when optical intensity modulation and optical phase modulation are used together, there is a problem that optical phase modulation cannot be applied to a bit slot with zero optical intensity. Furthermore, in optical-intensity modulation, it is difficult to accomplish multilevel of 3-bit per symbol or more.

SUMMARY OF THE INVENTION

An optical multilevel-coded signal transmission system according to one exemplary embodiment of the invention is a system to transmit information from an optical transmitter to an optical receiver through an optical transmission line using optical intensity and optical phase separately. The optical transmitter comprises an inverted return to zero (RZ) signal light generator to generate an inverted RZ signal light intensity-modulated by a first data D1 and an optical phase modulator to phase-modulate the inverted RZ signal light according to a second data D2. The optical receiver comprises a splitter to split a light input from the optical transmission line into first and second portions, an inverter to invert the first portion from the splitter, a first detector to detect the first data D1 in the first portion inverted by the inverter, a converter to convert a phase-modulated signal included in the second portion form the splitter into an optical intensity-modulated signal, and a second detector to detect the second data D2 in the optical intensity-modulated signal from the converter.

Since an inverted RZ signal light has a finite time slot energy for both high and low levels of data D1, it is possible to superimpose another data D2 by using PSK modulation format. With this simple configuration, multilevel-coded signal transmission using both intensity modulation and phase modulation is realized.

Preferably, the inverted RZ signal light generator comprises an RZ pulse signal light generator to generate an RZ pulse signal light intensity-modulated with the first data D1 and an inverted RZ converter to convert the RZ pulse signal light into an inverted RZ format. With this configuration, an inverted RZ signal light is easily generated.

Preferably, the RZ pulse signal light generator comprises a first laser light source to generate a laser light of a first wavelength $\lambda 1$ and an optical intensity modulator to intensity-modulate an output light from the first laser light source with the first data D1 to generate the RZ pulse signal light. With this configuration, an RZ pulse signal light for carrying the first data D1 can be easily generated.

Preferably, the inverted RZ converter comprises a second laser light source to generate a CW laser light of a second wavelength $\lambda 2$ and a first optical processor to generate a signal light of a second wavelength $\lambda 2$ having a waveform corresponding to a waveform which is an inversion of a waveform of the RZ pulse signal light using interaction of the RZ pulse signal light and an output light from the second laser light source. With this configuration, an RZ pulse signal light can be converted efficiently into an inverted RZ format.

Preferably, the inverted RZ signal light generator comprises a third laser light source to generate a CW laser light of a first wavelength $\lambda 1$, an inverted RZ data generator to output an electric signal of an inverted RZ form indicating the first data D1, and an optical intensity modulator to modulate the intensity of an output light from the third laser light source according to an output electric signal from the inverted RZ data generator to output an inverted RZ signal light intensity-modulated by the first data D1. With this configuration, an inverted RZ signal light can be easily generated.

Preferably, the inverter comprises a fourth laser light source to output a CW laser light of a third wavelength $\lambda 3$ and a second optical processor to generate a signal light of the third wavelength $\lambda 3$ having a waveform corresponding to an inverted form of a waveform of one of the first and second portions from the splitter using interaction of one of the first and second portions from the splitter and the output light from the fourth laser light source. With this configuration, the inverted RZ signal light can be easily converted to RZ format.

Preferably, the converter comprises a 1-bit delay interferometer. With this configuration, a phase-modulated signal light can be converted into an intensity-modulated signal light. Preferably, the second detector comprises a balanced receiver to balance-receive two output lights from the 1-bit delay interferometer. The balanced receiving makes it possible to reduce the influence of intensity fluctuation due to the intensity modulation by the first data D1.

An optical multilevel-coded signal transmission method according to one exemplary embodiment of the invention is a method to transmit information through an optical transmission line using optical intensity and optical phase separately. An inverted RZ signal light intensity-modulated with a first data D1 is generated. The inverted RZ signal light is phase-modulated according to a second data D2. The phase-modulated RZ pulse signal light is output into an optical transmission line. A splitter splits a light output from the optical transmission line into first and second portions. An inverter inverts the first portion from the splitter. The first data D1 is detected in the first portion inverted by the inverter. A phase-modulated signal included in the second portion from the splitter is converted into an optical intensity-modulated signal. The second data D2 is detected in the optical intensity-modulated signal.

With this method, multilevel-coded signal transmission using both intensity modulation and phase modulation can be realized with a simple configuration.

Preferably, the generating an inverted RZ signal light intensity-modulated with the first data D1 comprises generating an RZ pulse signal light intensity-modulated with the first data D1 and inverting the RZ pulse signal light. With this method, an inverted RZ signal light capable of being phase-modulated is generated.

Preferably, the generating an inverted RZ signal light intensity-modulated with the first data D1 comprises generating an electric signal of inverted RZ format indicating the first data D1 and intensity-modulating a CW laser light according to the inverted RZ electric signal. With this method, an inverted RZ signal light capable of being phase-modulated is generated.

An optical transmitter according to one exemplary embodiment of the invention comprises an inverted RZ signal light generator to output an inverted RZ signal light intensity-modulated with a first data D1 and an optical phase modulator to phase-modulate the inverted RZ signal light according to a second data D2.

Since the inverted RZ signal light has a light for every level of the first data D1, the second data D2 can be transmitted by phase-modulating the inverted RZ signal light. With this simple configuration, multilevel-coded signal transmission using both intensity modulation and phase modulation can be realized.

Preferably, the inverted RZ signal light generator comprises an RZ pulse signal light generator to generate an RZ pulse signal light intensity-modulated with the first data D1 and an inverted RZ converter to convert the RZ pulse signal light into an inverted RZ format. With this configuration, an inverted RZ signal light can be easily generated.

Preferably, the RZ pulse signal light generator comprises a first laser light source to generate a laser light of a first wavelength $\lambda 1$ and an optical intensity modulator to intensity-modulate an output light from the first laser light source with the first data D1 to generate the RZ pulse signal light. With this configuration, an RZ pulse signal light for carrying the first data D1 can be easily generated.

Preferably, the inverted RZ converter comprises a second laser light source to output a CW laser light of a second wavelength $\lambda 2$ and a first optical processor to generate a signal light of the wavelength $\lambda 2$ having a waveform corresponding to an inverted form of a waveform of the RZ pulse signal light using inter action between the RZ pulse signal light and the output light from the secondlaser light source. With this configuration, an RZ pulse signal light is efficiently converted into an inverted RZ format.

Preferably, the inverted RZ generator comprises a third laser light source to generate a CW laser light of the first wavelength $\lambda 1$, an inverted RZ data generator to generate an electric signal of an inverted RZ format indicating the first data D1, and an optical intensity modulator to intensity-modulate an output light from the third laser light source according to an output electric signal from the inverted RZ data generator to generate the inverted RZ signal light intensity-modulated with the first data D1. With this configuration, an inverted RZ signal light can be easily generated.

A multilevel-coded signal light generating method according to one exemplary embodiment of the invention is a method to generate a multilevel-coded signal light to carry information using optical intensity and optical phase separately. The method includes: generating an inverted RZ signal light intensity-modulated with a first data D1 and phase-modulating the inverted RZ signal light according to a second data D2.

Since the inverted RZ signal light has a light for every level of the first data D1, the second data D2 can be transmitted by phase-modulating the inverted RZ signal light. With this method, multilevel-coded signal transmission using both intensity modulation and phase modulation is realized.

Preferably, the generating an inverted RZ signal light intensity-modulated with the first data D1 comprises generating an RZ pulse signal light intensity-modulated with the first data D1 and inverting the RZ pulse signal light. With this method, an inverted RZ signal light is easily generated.

Preferably, the generating an inverted RZ signal light intensity-modulated with the first data D1 comprises generating an electric signal of an inverted RZ format indicating the first data D1 and intensity-modulating a CW laser light according to the inverted RZ electric signal.

An optical multilevel-coded signal transmission system according to one exemplary embodiment of the invention is a system to transmit information from an optical transmitter to an optical receiver through an optical transmission line using optical intensity and optical phase separately. The optical transmitter comprises a laser light source of a first wavelength, an inverted RZ data generator to generate an electric signal of an inverted RZ format indicating a first data D1, an optical phase modulator to phase-modulate an output light from the laser light source according to a second data D2, and an optical intensity modulator to intensity-modulate a light phase-modulated by the optical phase modulator according to an electric signal output from the inverted RZ data generator. The optical receiver comprises a splitter to split an input light from the optical transmission line into first and second portions, an inverter to invert the first portion from the splitter, a first detector to detect the first data D1 in the first portion inverted by the inverter, a converter to convert a phase-modulated signal included in the second portion from the splitter into an optical intensity-modulated signal, and a second detector to detect the second data D2 in an output from the converter.

Since the first data D1 is transmitted as an intensity-modulated signal light of an inverted RZ format, it is possible that the optical receiver separately receive the first data D1 transmitted through intensity modulation and the second data D2 transmitted through phase modulation. With this method, a multilevel-coded signal transmission using both intensity modulation and phase modulation can be realized with a simple configuration.

Preferably, the inverter comprises a CW light source to generate a laser light of a second wavelength $\lambda 3$ different from a wavelength of a signal light input from the optical transmission line, and an optical processor to generate a signal light of the second wavelength $\lambda 3$ having a waveform corresponding to an inverted format of a waveform of one of the first and second portion from the splitter using interaction between one of the first and second portion from the splitter and the laser light from the CW light source. With this configuration, an inverted RZ signal light can be converted into an RZ format.

Preferably, the converter comprises a 1-bit delay interferometer. With this configuration, a phase-modulated signal light can be converted into an intensity-modulated signal light. Preferably, the second detector comprises a balanced receiver to receive two output lights from a 1-bit delay interferometer in balance. An intensity-modulated component of the first data D1 included in an output from the 1-bit delay interferometer can be suppressed by this balanced receiving. This makes it possible to accurately detect the second data D2 transmitted through phase modulation.

An optical multilevel-coded signal transmission method according to one exemplary embodiment of the invention is a method to transmit information through an optical transmission line using optical intensity and optical phase separately. A first data D1 is converted into an inverted RZ format. A phase-modulated signal light is generated by phase-modulating a laser light according to a second data. The phase-modulated signal light is intensity-modulated according to the first inverted RZ data. The phase-modulated and intensity-modulated signal light is output into an optical transmission line. A splitter splits a light output from the optical transmission line into first and second portions. An inverter inverts one of the two output signals. The first data D1 is detected in the first portion inverted by the inverter. The phase-modulated signal included in the other signal light from the splitter is converted into the second portion. The second data D2 is detected in the optical intensity-modulated signal.

This method realizes multilevel-coded signal transmission using both intensity modulation and phase modulation with a simple structure.

An optical transmitter according to one exemplary embodiment of the invention comprises a laser light source, an inverted RZ data generator to output an electrical signal of an inverted RZ format indicating a first data D1, an optical phase modulator to phase-modulate an output light form the laser light source according to a second data D2, and an optical intensity modulator to intensity-modulate a light phase-modulated by the optical phase modulator according to the electric signal from the inverted RZ data generator.

Since the first data D1 is transmitted as an intensity-modulated signal light of an inverted RZ format, the receiver can receive the first data D1 transmitted through intensity modulation and the second data D2 transmitted through phase modulation separately. With this method, a multilevel-coded signal transmission using both intensity modulation and phase modulation can be realized in a simple configuration.

A multilevel-coded signal light generating method according to one exemplary embodiment of the invention is a method to generate a multilevel-coded signal light capable of transmitting information through optical intensity and optical phase separately. A first data D1 is converted into an inverted RZ form. A phase-modulated signal light is generated by phase-modulating a laser light according to a second data. The phase-modulated signal light is intensity-modulated according to the first inverted RZ data.

Since the first data D1 is transmitted as an intensity-modulated signal light of an inverted RZ format, the receiver can receive the first data D1 transmitted through intensity modulation and the second data D2 transmitted through phase modulation separately. With this method, a multilevel-coded signal transmission using both intensity modulation and phase modulation can be realized in a simple configuration.

The invention realizes multilevel-coded signal transmission using both intensity modulation and phase modulation in a simple structure.

BRIEF DESCRIPTION OF THE DRAWINGS

The above and other objects, features and advantages of the present invention will be apparent from the following detailed description of explanatory embodiments of the invention in conjunction with the accompanying drawings, in which.

DETAILED DESCRIPTION

Explanatory embodiments of the invention are explained below in detail with reference to the drawings.

Figure 1:
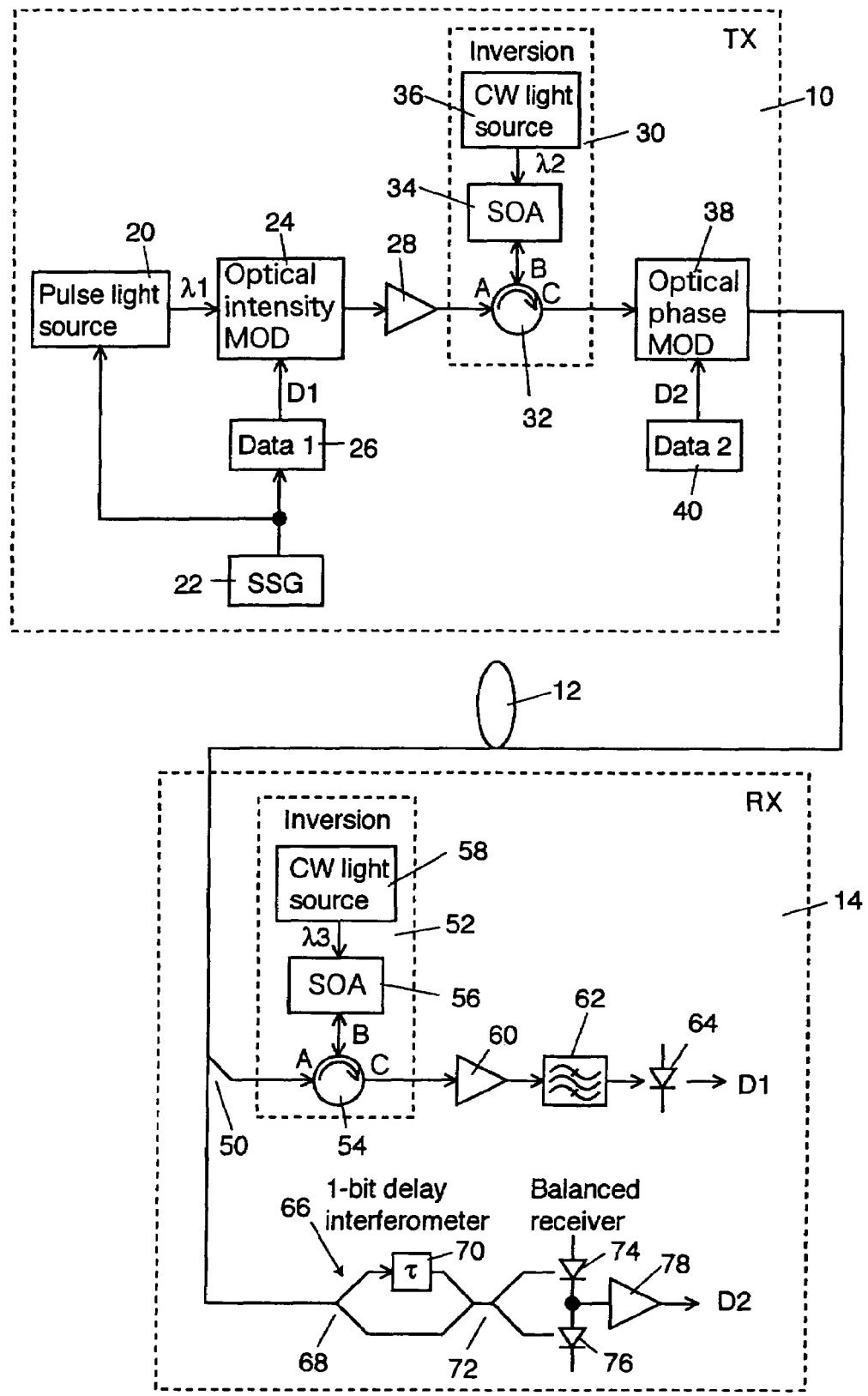
FIG. 1 is a schematic block diagram of a first explanatory embodiment according to the invention.
Figure 2:
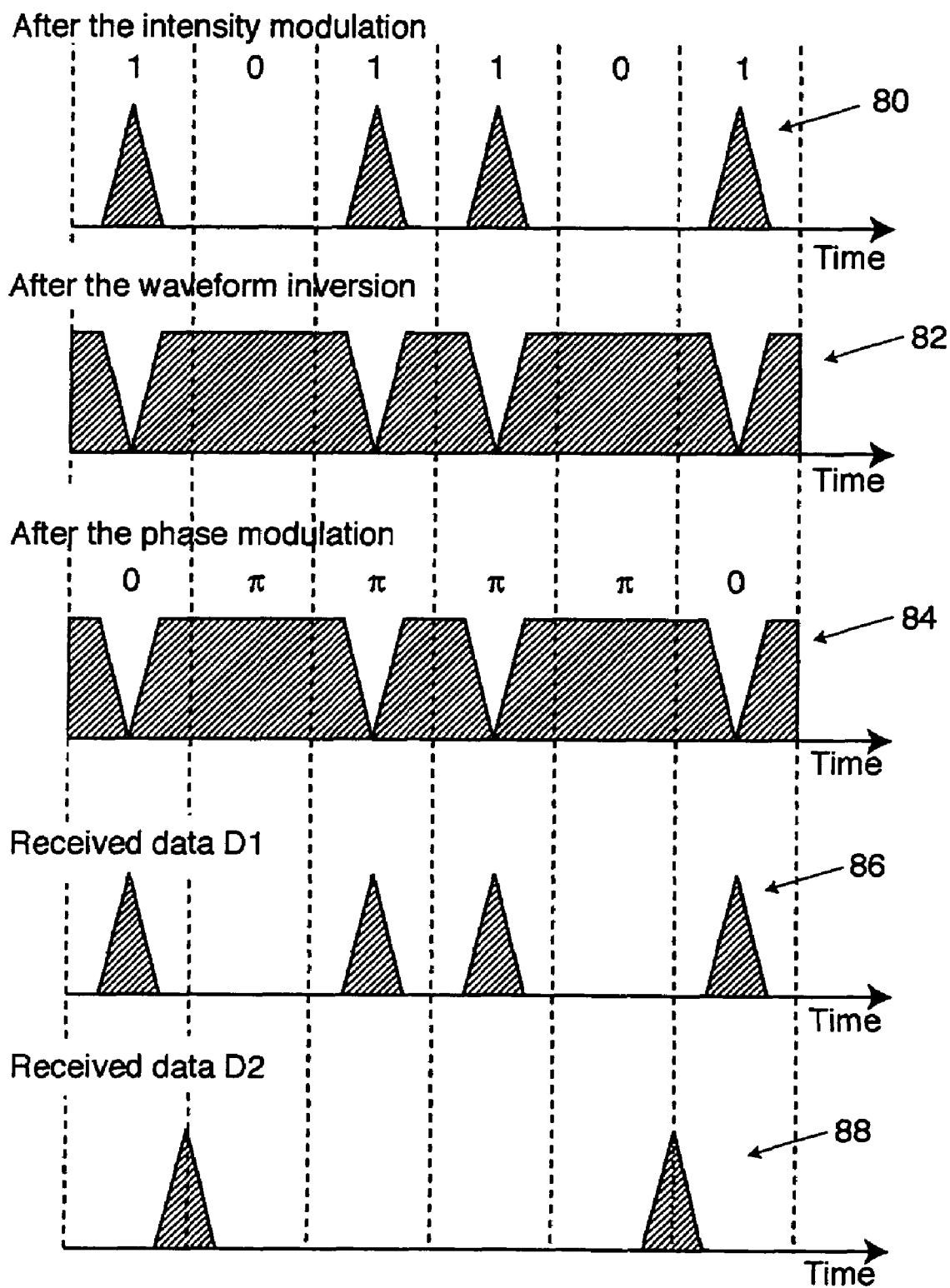
FIG. 2 shows waveform examples of the first explanatory embodiment.

FIG. 1 is a schematic block diagram of a first explanatory embodiment according to the invention, and FIG. 2 shows waveform examples of the first embodiment.

An optical transmitter 10 outputs a multilevel-coded signal light, which has been intensity-modulated and phase-modulated, into an optical transmission line 12. The multilevel-coded signal light propagated in the optical transmission line 12 enters an optical receiver 14. The optical receiver 14 receives a data D1 transmitted through intensity modulation and a data D2 transmitted through phase modulation separately. Examples to be used for the optical transmission line 12 can be a non-repeater optical transmission line having only optical fibers, an optical amplifier transmission line having optical fibers and optical amplifiers, and an optical fiber transmission line having dispersion compensators.

The configuration and operation of the optical transmitter 10 is explained below. A pulse light source 20 generates a pulse laser light of a wavelength % 1 having a frequency (e.g. 10 GHz) according to a clock from a sync-signal generator 22. Preferably, a duty ratio of the pulse laser light output from the laser light source 20 should be 50% or less, and a pulse width of the pulse laser light should be as narrow as possible.

The laser light source 20 comprises for example a laser element, e.g. a mode-locked laser, to output the pulse laser light. It is also applicable that the laser light source 20 comprises a laser diode to output a continuous wave (CW) laser light and an optical intensity modulator, e.g. an electroabsorption (EA) optical modulator, to pulse the CW laser light from the laser diode according to the clock from the sync-signal generator 22.

The pulse laser light output from the pulse light source is applied to an optical intensity modulator 24. The optical intensity modulator 24 comprises for example a crystal of $LiNbO_3$. A data generator 26 applies a data D1 into the optical intensity modulator 24 in synchronization with the output from the sync-signal generator 22. The optical intensity modulator 24 ON/OFF-modulates the pulse laser light output from the pulse light source 20 according to the data D1. The optical intensity modulator 24 outputs an RZ pulse signal light for carrying the data D1. A waveform 80 in FIG. 2 shows output waveform example from the optical intensity modulator 24. That is, the part composed of the pulse light source 20, the optical intensity modulator 24, and the data generator 26 becomes a circuit to generate an RZ pulse signal light for carrying the first data D1. The data D1 of the example in FIG. 2 comprises a binary number train of 1, 0, 1, 1, 0, 1.

An optical amplifier 28 optically amplifies an output light from the optical intensity modulator 24. An output light from the optical amplifier 28 is applied to a port A of an optical circulator 32 in an inverter 30. The inverter 30 is a device to invert a waveform of an RZ pulse signal light carrying the data D1. The optical circulator 32 applies a light input through its port A from the optical amplifier 28 into a semiconductor optical amplifier (SOA) 34 through its port B. The inverter 30 comprises a CW light source 36 to output a continuous wave laser light of a wavelength λ2 different from the wavelength λ1. The output light from the CW light source 36 enters the port B of the optical circulator 32 through the semiconductor optical amplifier 34. That is, the output light from the optical amplifier 28, namely RZ pulse signal light of the wavelength λ1 carrying the data D1, and the CW laser light of the wavelength λ2 from the CW light source 36 enter the SOA 34.

Owing to the cross-gain modulation (XGM) of the SOA 34, the gain relative to the CW laser light of the wavelength λ2 fluctuates according to optical intensity of the RZ pulse signal light of the wavelength λ1. Specifically, the gain relative to the wavelength λ2 decreases when an optical pulse of an RZ pulse signal light of the wavelength λ1 exists and increases when the optical pulse does not exist. Consequently, a waveform of a laser light of the wavelength λ2 output from the SOA 34 has an inverted format of the RZ pulse signal light of the wavelength λ1. The laser light of the wavelength λ2 output from the SOA 34 enters the port B of the optical circulator 32 and is applied to an optical phase modulator 38 from the port C of the optical circulator 32. A waveform 82 in FIG. 2 shows a waveform example of the laser light of the wavelength λ2 output from the SOA 34, namely a waveform example of a laser light of the wavelength λ2 applied to the optical phase modulator 38 from the port C of the optical circulator 32. In an output light from the inverter 30, light exists in intervals of a binary level "0" and exists most of intervals of a binary level "1" as shown for a waveform 82 in FIG. 2, and accordingly a data can be transmitted by phase-modulating the output light.

In this specification, a signal format or signal such that 1 bit slot has partially a period of no light for one of binary levels (e.g. "1") and is filled with light for the other binary level (e.g. "0"), like an output signal light from the inverter 30 is named as an inverted RZ format or inverted RZ signal. As one of examples of such inverted RZ format optical pulses, a dark soliton is well known in the art. For example, see M. Nakazawa and K. Suzuki, "Generation of a pseudorandom dark soliton train and its coherent detection by one-bit-shifting with a mach-Zehnder interferometer," Electronics letters 22nd Jun. 1995, Vol. 31, No. 13, pp. 1084-1085.

A data generator 40 generates a second data D2 and applies it to the optical phase modulator 38 as a driving signal. The optical phase modulator 38 modulates optical phase of the output light from the inverter 30, namely optical phase of the output light from the port C of the optical circulator 32, into 0 or π according to the data D2. A waveform 84 in FIG. 2 shows a waveform and optical phase of an output light from the optical phase modulator 38. Here, the optical phase is modulated to 0, π, π, π, π, 0. In the waveform 84 shown in FIG. 2, although the phase modulation by the optical phase modulator 38 is shown synchronizing with a bit slot of the data D1 to make it clearly understandable, it is not necessary to synchronize the intensity modulation by the optical intensity modulator 24 and the phase modulation by the optical phase modulator 38. It is applicable to dispose an optical bandpass filter between the port C of the optical circulator 32 and the optical phase modulator 38 for selectively transmitting a light of the wavelength λ2 so that a light other than the wavelength λ2 does not enter the optical phase modulator 38.

An output light from the optical phase modulator 38 enters into the optical transmission line 12 as an output light from the optical transmitter 10 and transmits in the optical transmission line 12 to enter the optical receiver 14.

The configuration and operation of the optical receiver 14 is explained below. A splitter 50 splits a signal light from the optical transmission line 12 into two portions and applies one portion to a port A of an optical circulator 54 in an inverter 52 and the other to a 1 bit delay interferometer 66. The data D1 transmitted through intensity modulation is demodulated through the inverter 52 and the followings, and the data D2 transmitted through the phase modulation is demodulated through the 1 bit delay interferometer 66 and the followings.

The inverter 52 basically comprises the same configuration with the inverter 30. That is, the inverter 52 comprises a semiconductor optical amplifier (SOA) 56 and a CW light source 58 to output a CW laser light of wavelength λ3 different from the wavelength λ2. The wavelength λ3 can be identical to the wavelength λ1.

The optical circulator 54 applies a light input through the port A from the splitter 50 into the SOA 56 from a port B. An output light from the CW light source 58 enters the port B of the optical circulator 54 through the SOA 56. That is, both signal light of the wavelength λ2 being intensity-modulated and phase-modulated and CW laser light of the wavelength λ3 from the CW light source 58 enter the SOA 56. The inverter 52 inverts a waveform of a signal light output from the splitter 50 using the same function with the inverter 30. That is, the inverter 52 functions as an apparatus to restore a waveform from an inverted RZ format to an RZ format.

An optical amplifier 60 amplifies a signal light output from the inverter 54. An optical bandpass filter 62 extracts a component of the wavelength λ3 from an output light from the optical amplifier 60. A photodiode 64 converts an output signal light from the bandpass filter 62 into an electrical signal. An output electric signal from the photodiode 64 is an RZ signal carrying the data D1. A waveform 86 in FIG. 2 shows a waveform example of the output signal from the photodiode 64.

The 1-bit delay interferometer 66 has a well known structure comprising a splitter 68, a multiplexer/demultiplexer 72, and a 1-bit optical delay 70 disposed on one of two arms between the splitter 68 and the multiplexer/demultiplexer 72. A delay time τ of the 1-bit optical delay 70 equals to 1-bit period of the optical phase modulation by the optical phase modulator 38. Such 1-but delay interferometer 66 is well known in the art as an apparatus to convert a phase-modulated signal light into an intensity-modulated signal or On/Off keying (OOK) signal light. The 1-bit delay interferometer 66 outputs an optical pulse when an optical phase of the phase-modulated signal transits from 0 to π or from π to 0. Two photodiodes 74 and 76 connected in serial balance-receive an output signal light from the 1-bit delay interferometer 66. An amplifier 78 amplifies and outputs a balance-received electric signal. The amplifier 78, preferably, comprises an auto power control (APC) amplifier. Although intensity of an output from the 1-bit delay interferometer 66 fluctuates due to the intensity modulation for carrying the first data D1, it is possible to reduce the intensity fluctuation by using the balance-receiving of the photodiodes 74 and 76 and the AFC amplifier 78 together.

As explained above, the intensity modulation and phase modulation is performed neither in the same bit rate nor in synchronization. By differing a bit rate of intensity modulation from that of phase modulation, reception and detection of the data D2 becomes easier. For instance, by disposing a bandpass filter to extract a frequency component of the phase modulation of the data D2 or a band eliminate filter to eliminate a frequency component of the intensity modulation of the data D1, the influence of the intensity modulation can be easily removed.

An output signal from the amplifier 78 becomes an RZ signal for carrying the demodulated data D2. A waveform 88 in FIG. 2 shows a waveform example of the demodulated data D2. In the output electric signal from the amplifier 78, pulses exist when optical phase of a phase-modulated signal transits from 0 to π and from π to 0. When a DQPSK is used for the phase modulation, it is necessary to dispose a precoder between the optical phase modulator 38 and the data generator 40. In addition, a decoder corresponding to the precoder should be disposed on the output of the amplifier 78 in the optical receiver 14.

In the inverter 30, although a signal light and a CW light are applied to the SOA 34 in the opposite direction, a waveform of a signal light can be inverted even if a signal light and a CW light are input to the SOA 34 in the same direction. Specifically, a 3-dB optical coupler couples an output light from the optical amplifier 28 and an output light from the CW light source 36 and applies both lights into the SOA 34 in the same direction. An optical bandpass filter of wavelength λ2 is disposed on the output side of the SOA 34 to exclusively extract a light of the wavelength λ2 and to apply to the optical phase modulator 38. When the incidence is performed in the same direction, the operation becomes faster compared to the incidence in the opposite direction although it requires disposition of an optical bandpass filter.

In the inverter 52, similar to the inverter 30, it is possible to input a signal light and a CW light into the SOA in the same direction. Specifically, a 3-dB optical coupler couples a signal light from the splitter 50 and an output light from the CW light source 58 and applies both lights into the SOA 56 in the same direction. In addition, an optical bandpass filter of the wavelength λ3 is disposed on the output of the SOA 56 for extracting a light of the wavelength λ3 and to apply the extracted light to the optical amplifier 60.

Figure 3:
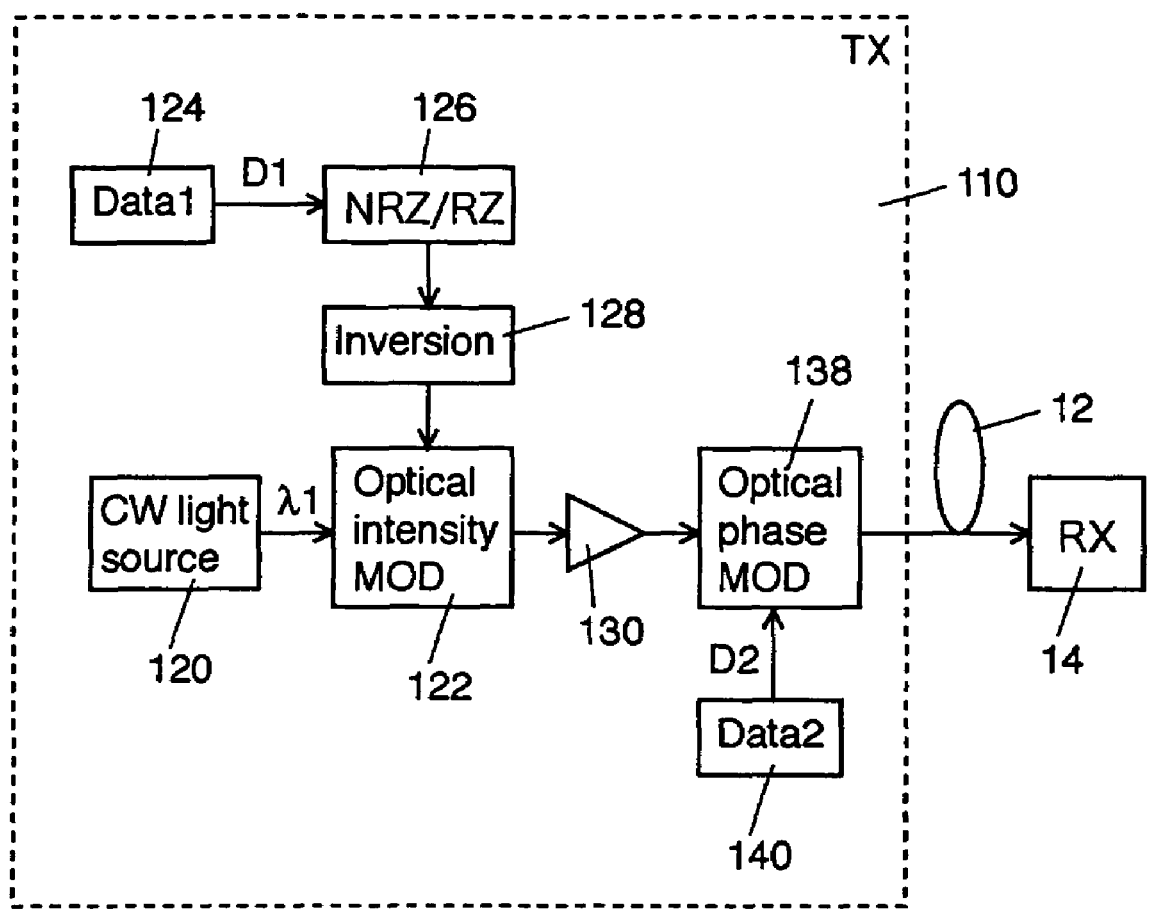
FIG. 3 is a schematic block diagram of a second explanatory embodiment according to the invention.

In the embodiment shown in FIG. 1, the optical intensity modulator 24 generates an RZ optical pulse signal for carrying a data D1, and the inverter 30 converted the RZ optical pulse signal into an inverted RZ format. Another method is also applicable to generate an optical pulse signal of an inverted RZ format; the method is to generate an inverted RZ signal in an electric stage and to binary-modulate intensity of a CW laser light with the inverted RZ signal. FIG. 3 shows a schematic block diagram of an optical transmitter 110 modified in such a manner. Elements identical to those shown in FIG. 1 are labeled with common reference numbers in FIG. 3.

The configuration and operation of the optical transmitter 110 is explained below. A CW light source 120 generates a CW laser light of a wavelength λ1. The CW laser light output from the CW light source 120 is applied to an optical intensity modulator 122. A data generator 124 outputs a to-be-transmitted data D1 in a NRZ (Non-Return to Zero) format. An NRZ/RZ converter 126 converts an output data from the data generator 124 into an RZ format, and an inverter 128 inverts an output from the converter 126 from an RZ format to an inverted RZ format. It is possible that one apparatus functions as both NRZ/RZ converter 126 and inverter 128. An output from the inverter 128 is applied to the optical intensity modulator 122 as a driving signal or modulating signal.

According to the output signal from the inverter 128, the optical intensity modulator 122 blocks an output from the CW light source 120 or transmits it at a low transmission rate or low gain when the output signal level from the inverter 128 is low just like a dark pulse corresponding to "1" of the binary levels, and transmits the output from the CW light source 120 at a high transmission rate or high gain when the output signal level from the inverter 128 is high just like a period corresponding to "0" of the binary levels. By this operation, the optical modulator 122 converts an electric signal of an inverted RZ format into an optical signal of an inverted RZ format.

An optical amplifier 130 optically amplifies the output signal from the optical intensity modulator 122. An output from the optical amplifier 130 is applied to an optical phase modulator 138. A data generator 140 generates a second data D2 and applies it to the optical phase modulator 138 as a driving signal. The optical phase modulator 138 modulates optical phase of the inverted RZ signal light output from the optical amplifier 130, namely an output signal light from the optical intensity modulator 122, into 0 or π according to the data D2. An output light from the optical phase modulator 138 enters the optical transmission line 12 as an output light from the optical transmitter 110.

The intensity-modulated and phase-modulated signal light propagates in the optical transmission line 12 and enters the optical receiver 14. The operation of the optical receiver 14 is omitted since it is substantially identical to the embodiment in FIG. 1.

Figure 4:
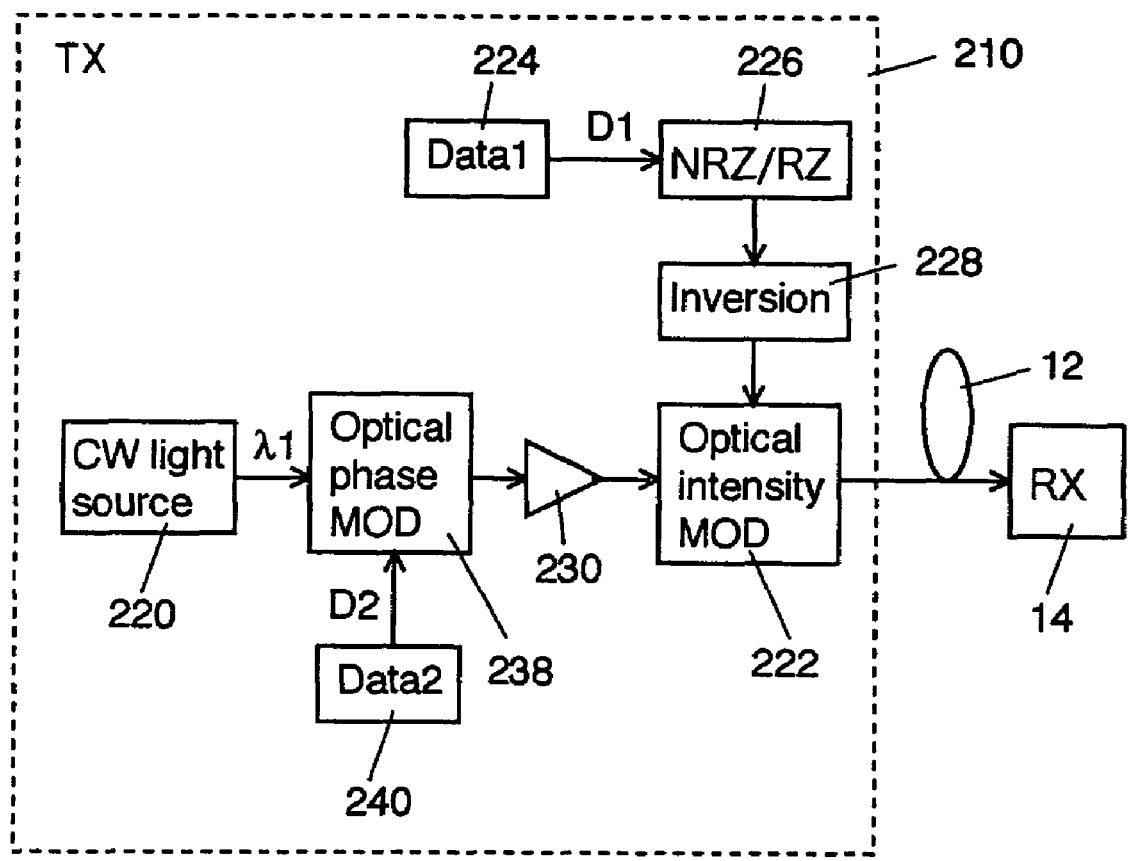
FIG. 4 is a schematic block diagram of a third explanatory embodiment according to the invention.

In the embodiments shown in FIGS. 1 and 3, although the optical phase modulator is disposed behind the optical intensity modulator, the order can be reversed. FIG. 4 shows a schematic block diagram of a modified explanatory embodiment in this manner. Elements identical to those shown in FIG. 1 are labeled with common reference numbers in FIG. 4.

The configuration and operation of an optical transmitter 210 is explained below. A CW light source 220 generates a CW laser light of a wavelength λ1. A CW laser light output from the CW light source 220 is applied to an optical phase modulator 238. A data generator 140 generates a second data D2 and applies it to an optical phase modulator 238 as a driving signal. The optical phase modulator 238 modulates optical phase of an output laser light from the CW light source 220 to 0 or π according to the data D2. An optical amplifier 230 amplifies an output light from the optical phase modulator 238 and applied it to an optical intensity modulator 222.

A data generator 224 outputs a to-be-transmitted data D1 in an NRZ format. An NRZ/RZ converter 226 converts an output data from the data generator 224 into an RZ format, and an inverter 228 converts an output from the converter 226 from an RZ format to an inverted RZ format. It is possible that one apparatus functions as both NRZ/RZ converter 226 and inverter 228. An output from the inverter 228 is applied to the optical intensity modulator 222 as a driving signal or modulating signal.

According to an output signal from the inverter 228, the optical intensity modulator 222 blocks an output from the CW light source 220 or transmits it at a low transmission rate or low gain when an output signal level from the inverter 228 is low just like a dark pulse corresponding to "1" of the binary levels and transmits the output light from the CW light source 220 at a high transmission rate or high gain when an output signal level is high just like a period corresponding to "0" of the binary levels. Thus, the optical modulator 222 converts an electric signal of an inverted RZ format to an optical signal of an inverted RZ format. An output light from the optical intensity modulator 222 enters an optical transmission line 12 as an output light from the optical transmitter 210.

The intensity-modulated and phase-modulated signal light propagates in the optical transmission line 12 and enters an optical receiver 14. The operation of the optical receiver 14 is omitted since it is identical to the embodiment shown in FIG. 1.

The data generators 26, 40, 124, 140, 224, and 240 shown in FIGS. 1, 3, and 4 can be any one of a data source, an input terminal of a data signal from an outer data source, an amplifier to amplify a data signal from an outer data source, and a waveform generator to generate a waveform of a data signal from an outer data source.

It is understood that time-division-multiplexing can be used together with the optical intensity modulation in the embodiments shown in FIGS. 1, 3, and 4. Also, it is obvious that DQPSK can be used as the optical phase modulation in the embodiments shown in FIGS. 1, 3, and 4. DQPSK is described for example in C. Wree, et al., "Experimental Investigation of Receiver Sensitivity of RZ-DQPSK Modulation Format Using Balanced Detection," OFC 2003, Vol. 2, ThE 5.

While the invention has been described with reference to the specific embodiment, it will be apparent to those skilled in the art that various changes and modifications can be made to the specific embodiment without departing from the spirit and scope of the invention as defined in the claims.

The invention claimed is:

1. An optical multilevel-coded signal transmission system to transmit information comprising: an optical transmitter, and an optical receiver for receiving the transmitted information through an optical transmission line using optical intensity and optical phase separately,
   wherein the optical transmitter comprises
   an inverted RZ signal light generator to generate an inverted RZ signal light intensity-modulated with a first data; and
   an optical phase modulator to phase-modulate the inverted RZ signal light according to a second data; and
   wherein the optical receiver comprises
   a splitter to split a light input from the optical transmission line into first and second portions;
   an inverter to invert the first portion from the splitter;
   a first detector to detect the first data in the first portion inverted by the inverter;
   a converter to convert a phase-modulated signal included in the second portion from the splitter into an optical intensity-modulated signal; and
   a second detector to detect the second data in the optical intensity-modulated signal from the converter.

2. The system of claim 1 wherein the inverted RZ signal light generator comprises
   an RZ pulse signal light generator to generate an RZ pulse signal light intensity-modulated with the first data; and
   an inverted RZ converter to convert the RZ pulse signal light into an inverted RZ format.

3. The system of claim 2 wherein the RZ pulse signal light generator comprises a laser light source to generate a laser light of a wavelength, and an optical intensity modulator to intensity-modulate an output light from the laser light source with the first data to generate the RZ pulse signal light.

4. The system of claim 2 wherein the inverted RZ converter comprises a laser light source to output a CW laser light of a wavelength and an optical processor to generate a signal light of the wavelength having a waveform corresponding to an inverted format of a waveform of the RZ pulse signal light using interaction between the RZ pulse signal light and the output light from the laser light source.

5. The system of claim 2 wherein the RZ pulse signal light generator comprises:
   a first laser light source to generate a laser light of a first wavelength; and
   an optical intensity modulator to intensity-modulate an output light from the first laser light source with the first data to generate the RZ pulse signal light and wherein the inverted RZ converter comprises:
   a second laser light source to output a CW laser light of a second wavelength; and
   a first optical processor to generate a signal light of the second wavelength having a waveform corresponding to an inverted format of a waveform of the RZ pulse signal light using interaction between the RZ pulse signal light and the CW laser light output from the second laser light source.

6. The system of claim 5 wherein the inverter comprises:
   a third laser light source to output a CW laser light of a third wavelength; and
   a second optical processor to generate a signal light of the third wavelength having a waveform corresponding to an inverted format of a waveform of the first portion from the splitter using interaction between the first portion from the splitter and the CW laser light output from the third laser light source.

7. The system of claim 1 wherein the inverted RZ signal light generator comprises
   a laser light source to generate a CW laser light of a wavelength;
   an inverted RZ data generator to output an electric signal of an inverted RZ format indicating the first data; and
   an optical intensity modulator to modulate intensity of an output light from the laser light source according to an output electric signal from the inverted RZ data generator and to output the inverted RZ signal light intensity-modulated with the first data.

8. The system of claim 1 wherein the inverter comprises a laser light source to output a CW laser light of a wavelength; and an optical processor to generate a signal light of the wavelength having a waveform corresponding to an inverted format of a waveform of the first portion from the splitter using interaction between the first portion from the splitter and the output light from the laser light source.

9. The system of claim 1 wherein the converter comprises a 1-bit delay interferometer.

10. The system of claim 9 wherein the second detector comprises a balanced receiver to balance-receive two output lights from the 1-bit delay interferometer.

11. The system of claim 1 wherein the inverted RZ signal light generator comprises
    a first laser light source to generate a CW laser light of a first wavelength;
    an inverted RZ data generator to output an electric signal of an inverted RZ format indicating the first data; and
    an optical intensity modulator to modulate intensity of an output light from the first laser light source according to an output electric signal from the inverted RZ data generator and to output the inverted RZ signal light intensity-modulated with the first data.

12. The system of claim 11 wherein the inverter comprises:
    a second laser light source to output a CW laser light of a second wavelength; and
    an optical processor to generate a signal light of the second wavelength having a waveform corresponding to an inverted format of a waveform of the first portion from the splitter using interaction between the first portion from the splitter and the CW laser light output from the second laser light source.

13. The system of claim 1 wherein the inverted RZ signal light generator comprises:
    a first laser light source to generate a CW laser light of a first wavelength;
    an inverted RZ data generator to output an electric signal of an inverted RZ format indicating the first data; and
    an optical intensity modulator to modulate intensity of an output light from the third laser light source according to an output electric signal from the RZ data generator and to output the inverted RZ signal light intensity-modulated with the first data, and wherein the inverter comprises:

a second laser light source to output a CW laser light of a second wavelength; and an optical processor to generate a signal light of the second wavelength having a waveform corresponding to an inverted format of a waveform of the first portion from the splitter using interaction between the first portion from the splitter and the CW laser light output from the second laser light source.

14. An optical multilevel-coded signal transmission method to transmit information through an optical transmission line using optical intensity and optical phase separately comprising:

generating an inverted RZ signal light intensity-modulated with a first data D1;

phase-modulating the inverted RZ signal light according to a second data;

outputting a phase-modulated RZ pulse signal light by the phase-modulating step into the optical transmission line;

splitting a light output from the optical transmission line into first and second portions by a splitter;

inverting the first portion from the splitter by an inverter;

detecting the first data in the first portion inverted by the inverter;

converting a phase-modulated signal included in the other second portion from the splitter into an optical intensity-modulated signal; and detecting the second data in the optical intensity-modulated signal.

15. The method of claim 14 wherein the generating an inverted RZ signal light intensity-modulated with the first data comprises generating an RZ pulse signal light intensity-modulated with the first data and inverting the RZ pulse signal light.

16. The method of claim 14 wherein the generating an inverted RZ signal light intensity-modulated with the first data comprises generating an electric signal of an inverted RZ format indicating the first data and intensity-modulating a CW laser light according to the electric signal of the inverted RZ format.

* * * * *